(12) United States Patent
Amine et al.

(10) Patent No.: US 9,246,187 B2
(45) Date of Patent: Jan. 26, 2016

(54) NON-AQUEOUS ELECTROLYTE FOR LITHIUM-ION BATTERY

(71) Applicant: UChicago Argonne LLC, Chicago, IL (US)

(72) Inventors: Khalil Amine, Oak Brook, IL (US); Lu Zhang, Lisle, IL (US); Zhengcheng Zhang, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 314 days.

(21) Appl. No.: 13/803,725

(22) Filed: Mar. 14, 2013

(65) Prior Publication Data
US 2014/0272607 A1 Sep. 18, 2014

(51) Int. Cl.
| | |
|---|---|
| H01M 10/0525 | (2010.01) |
| H01M 10/056 | (2010.01) |
| H01M 10/052 | (2010.01) |
| H01M 10/0567 | (2010.01) |
| H01M 10/0568 | (2010.01) |
| H01M 10/0569 | (2010.01) |

(52) U.S. Cl.
CPC ........ *H01M 10/052* (2013.01); *H01M 10/0567* (2013.01); *H01M 10/0568* (2013.01); *H01M 10/0569* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 5,626,981 | A | 5/1997 | Simon et al. |
| 7,968,235 | B2 | 6/2011 | Amine et al. |
| 2004/0157126 | A1 | 8/2004 | Belharouak et al. |
| 2005/0019670 | A1 | 1/2005 | Amine et al. |
| 2009/0017386 | A1 | 1/2009 | Xu et al. |
| 2011/0065961 | A1* | 3/2011 | Tanaka .................. C07F 9/5022 568/17 |
| 2011/0281178 | A1* | 11/2011 | Kobayashi ........ H01M 10/0525 429/332 |

FOREIGN PATENT DOCUMENTS

| | | |
|---|---|---|
| EP | 0490048 | 6/1992 |
| JP | 62290072 | 12/1987 |
| JP | 4087156 | 3/1992 |
| JP | 04095362 | 3/1992 |
| JP | 2000-149985 | 5/2000 |
| JP | 2007242441 A * | 9/2007 |
| JP | 2008146862 A * | 6/2008 |
| JP | 2013012442 A * | 1/2013 |
| WO | WO-97/44842 | 11/1997 |
| WO | WO-98/15024 | 4/1998 |
| WO | WO 00/79632 | 12/2000 |

OTHER PUBLICATIONS

U.S. Appl. No. 60/636,636, filed Dec. 16, 2004, Argonne National Laboratory.

U.S. Appl. No. 60/647,361, filed Jan. 26, 2005, Argonne National Laboratory.

Chung et al., "Origin of Graphite Exfoliation—An Investigation of the Important Role of Solvent Cointercalation", Journal of Electrochemical Society, 2000, 147(12), pp. 4391-4398.

Xu et al., "Lithium Bis(oxalato)borate Stablizes Graphite Anode in Propylene Carbonate", Electrochemical and Solid-State Letters, 2002, 5(11), pp. A259-A262.

* cited by examiner

*Primary Examiner* — Tanisha Diggs
(74) *Attorney, Agent, or Firm* — Foley & Lardner LLP (57) ABSTRACT

A substantially non-aqueous electrolyte solution includes an alkali metal salt, a polar aprotic solvent, and an organophosphorus compound of Formula IA, IB, or IC:

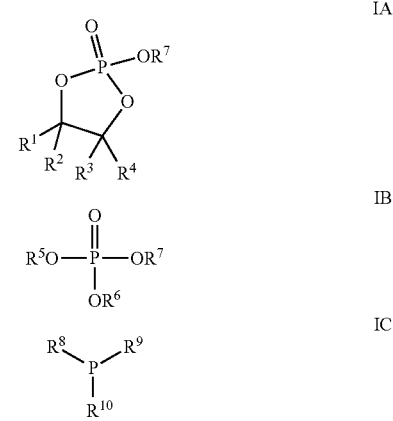

where $R^1$, $R^2$, $R^3$ and $R^4$ are each independently hydrogen, halogen, alkyl, alkenyl, alkynyl, cycloalkyl, aryl, heterocyclyl, heteroaryl, alkoxy, alkenoxy, alkynoxy, cycloalkoxy, aryloxy, heterocyclyloxy, heteroaryloxy, siloxyl, silyl, or organophosphatyl; $R^5$ and $R^6$ are each independently alkyl, alkenyl, alkynyl, cycloalkyl, aryl, heterocyclyl, or heteroaryl; $R^7$ is

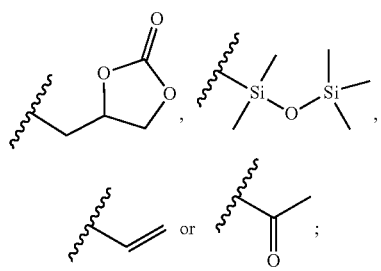

and $R^8$, $R^9$ and $R^{10}$ are each independently alkyl, cycloalkyl, aryl, heterocyclyl, or heteroaryl; provided that if the organophosphorus compound is of Formula IB, then at least one of $R^5$, and $R^6$ are other than hydrogen, alkyl, or alkenyl; and if the organophosphorus compound is of Formula IC, then the electrolyte solution does not include 4-methylene-1,3-dioxolan-2-one or 4,5-dimethylene-1,3-dioxolan-2-one.

17 Claims, 8 Drawing Sheets

NON-AQUEOUS ELECTROLYTE FOR LITHIUM-ION BATTERY

GOVERNMENT RIGHTS

The United States Government has rights in this invention pursuant to Contract No. DE-W-31-109-ENG-38 awarded by the U.S. Department of Energy.

FIELD

The present technology generally relates to lithium rechargeable batteries. More particularly the technology relates to the use of film forming additives in electrochemical cells and batteries.

BACKGROUND

Advances in the science and engineering of lithium-ion batteries have resulted in lithium-ion batteries becoming the most popular power source for portable electronic devices, and recently, as a power source for electric and hybrid electric vehicles.

Within the lithium-ion cell, the interface between the anode and the electrolyte is of particular importance, and it is a major factor with regard to overall cell performance. In particular, a thin passivation layer, also called SEI (solid electrolyte interface), is typically formed during the first charging process and prevents further reactions of the electrolyte on the anode surface. For cells utilizing carbon anodes, the SEI formation is potential dependant and stepwise, and is ultimately determined by the reactive component of the electrolyte.

Currently, the state-of-the-art electrolytes for lithium-ion battery utilize lithium hexafluorophosphate ($LiPF_6$) as an electrolyte salt and carbonates, such as ethylene carbonate, as solvents. Ethylene carbonate (EC) prevents the formation of SEI at the surface of the negative electrode so that good battery performances can be achieved. However, in many cases the SEI protection achieved from using electrolytes with simple formulations, such as $LiPF_6$ in EC and/or other carbonates, is insufficient where the negative electrode contains carbonaceous. For instance, when cycling under elevated temperature, the capacities of carbon-anode lithium-ion batteries can fade very quickly. Additionally, when using a non-graphite carbon anode, such as natural graphite and hard carbon (an amorphous non-graphitic carbon), the batteries exhibit a higher initial discharge capacity that is quickly lost in subsequent cycles.

The performance of lithium ion batteries containing EC-based electrolytes is limited to low temperature applications. For higher temperature applications, propylene carbonate (PC) has been considered to fully or partially replace EC as PC remains liquid over a wider temperature window (−55 to 240° C.) than EC. $LiPF_6$—PC-based electrolytes, however, are not compatible with graphite electrodes due to exfoliation of the graphite structure by PC intercalation.

However, there is still a need for effective additives and/or co-solvents in the electrolyte of lithium-ion batteries to prevent the formation of SEI films on graphic, or other carbonaceous electrodes, to prevent or reduce further decomposition of solvent molecules over long service lives, and/or to prevent the intercalation of PC into graphite anodes.

SUMMARY

In one aspect, a substantially non-aqueous electrolyte solution is provided including: an alkali metal salt; a polar aprotic solvent; and an organophosphorus compound selected from Formula IA, IB, or IC:

In Formula IA, $R^1$, $R^2$, $R^3$ and $R^4$ are each independently hydrogen, halogen, alkyl, alkenyl, alkynyl, cycloalkyl, aryl, heterocyclyl, heteroaryl, alkoxy, alkenoxy, alkynoxy, cycloalkoxy, aryloxy, heterocyclyloxy, heteroaryloxy, siloxyl, silyl, or organophosphatyl. In Formula IB, $R^5$ and $R^6$ are each independently hydrogen, alkyl, alkenyl, alkynyl, cycloalkyl, aryl, heterocyclyl, or heteroaryl. In Formula IC, $R^8$, $R^9$, and $R^{10}$ are each independently alkyl, cycloalkyl, aryl, heterocyclyl, or heteroaryl. In Formulas IA, IB, and IC, $R^7$ is However, if the organophosphorus compound is one of Formula IB, then at least one of $R^5$ and $R^6$ are other than hydrogen, alkyl, or alkenyl; and if the organophosphorus compound is of Formula IC, then the electrolyte solution does not include 4-methylene-1,3-dioxolan-2-one or 4,5-dimethylene-1,3-dioxolan-2-one.

In yet another aspect, an electrochemical device is provided including a cathode; an anode; a porous separator which separates the anode and the cathode; and a substantially non-aqueous electrolyte as provided above and herein.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The term "spinel" refers to a manganese-based spinel such as, e.g., $Li_{1+x}Mn_{2-z}Met_yO_{4-m}X_n$, wherein Met is Al, Mg, Ti, B, Ga, Si, Ni, or Co; X is S or F; and wherein $0 \le x \le 0.3$, $0 \le y \le 0.5$, $0 \le z \le 0.5$, $0 \le m \le 0.5$ and $0 \le n \le 0.5$.

The term "olivine" refers to an iron-based olivine such as, e.g., $LiFe_{1-z}Met"_yPO_{4-m}X_n$, wherein Met" is Al, Mg, Ti, B, Ga, Si, Ni, Mn or Co; X is S or F; and wherein $0 \le x \le 0.3$; $0 \le y \le 0.5$, $0 \le z \le 0.5$, $0 \le m \le 0.5$ and $0 \le n \le 0.5$.

In general, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a per-haloalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 2 to 12 carbons, or, typically, from 2 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, CH—CH=CH$_2$, C=CH$_2$, or C=CHCH$_3$.

Alkynyl groups are straight chain, branched or cyclic alkyl groups having 2 to about 20 carbon atoms, and further including at least one triple bond. In some embodiments alkynyl groups have from 2 to 6 carbons, or, typically, from 2 to 4 carbon atoms. Alkynyl groups may be substituted or unsubstituted. Alkynyl groups may be substituted similarly to alkyl groups. Divalent alkynyl groups, i.e., alkynyl groups with two points of attachment, include, but are not limited to, CH—C≡CH, C≡CH, or C≡CCH$_3$.

As used herein, "aryl", or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

As used herein, "heteroaryl" groups are aryl groups as defined herein, wherein from one to three carbon atoms are replaced with a heteroatom selected from N, O and S.

As used herein, "heterocyclyl" groups are cycloalkyl groups as defined herein, wherein from one to three carbon atoms are replaced with a heteroatom selected from N, O and S.

In one aspect, provided is a substantially non-aqueous electrolyte solution that includes an alkali metal salt, a polar aprotic solvent, and an organophosphorus compound of Formula IA, IB, or IC, or a mixture of any two or more such organophosphorus compounds. As used herein, Formulas IA, IB, and IC refer to the following structures:

IA

IB

IC

In Formula IA, $R^1$, $R^2$, $R^3$ and $R^4$ are each independently hydrogen, halogen, alkyl, alkenyl, alkynyl, cycloalkyl, aryl, heterocyclyl, heteroaryl, alkoxy, alkenoxy, alkynoxy, cycloalkoxy, aryloxy, heterocyclyloxy, heteroaryloxy, siloxyl, silyl, or organophosphatyl. In Formula IA, $R^7$ may be According to some embodiments of Formula IA, $R^1$, $R^2$, $R^3$ and $R^4$ are each independently hydrogen, halogen, alkyl, or substituted alkyl. According to any of the above embodiments for Formula IA, $R^7$ may be a group of formula

In any of the above embodiments of Formula IA, $R^1$, $R^2$, $R^3$ and $R^4$ may each independently be hydrogen, methyl, ethyl, n-propyl, iso-propyl, n-butyl, sec-butyl, tert-butyl, 2-propenyl, 3-butenyl, 2-propynyl or 3-butynyl. In any of the above embodiments of Formula IA, $R^1$, $R^2$, $R^3$ and $R^4$ may each be hydrogen.

Illustrative compounds of Formula IA, include, but are not limited to:

One or more of any of these compounds may be included in the electrolytes.

In Formula IB, $R^5$ is hydrogen, alkyl, alkenyl, alkynyl, cycloalkyl, aryl, heterocyclyl, or heteroaryl, and $R^6$ is hydrogen, alkyl, alkenyl, alkynyl, cycloalkyl, aryl, heterocyclyl, or heteroaryl, where at least one of $R^5$ and $R^6$ is other than hydrogen, alkyl, or alkenyl. In Formula IB, $R^7$ may be

According to some embodiments of Formula IB, $R^5$ and $R^6$ are each independently alkyl, substituted alkyl, or polyethylene oxide. According to any of the above embodiments for Formula IB, $R^7$ may be a group of formula In any of the above embodiments with respect to Formula IB, $R^5$ and $R^6$ may each independently be methyl, ethyl, n-propyl, iso-propyl, n-butyl, sec-butyl, tert-butyl, 2-propenyl, 3-butenyl, 2-propynyl or 3-butynyl. In any of the above embodiments, $R^5$ and $R^6$ may be methyl.

Illustrative compounds of Formula IB include, but are not limited to:

The electrolytes may include any one or more of such compounds of Formula IB.

In Formula IC, $R^8$, $R^9$ and $R^{10}$ are each independently alkyl, alkenyl, alkynyl, cycloalkyl, aryl, heterocyclyl, or heteroaryl. In Formula IC, $R^7$ may be According to some embodiments of Formula IC, $R^5$ and $R^6$ are each independently alkyl, substituted alkyl, or polyethylene oxide. According to any of the above embodiments for Formula IC, $R^7$ may be a group of formula

In some embodiments, where the electrolyte includes a compound of Formula IC, the electrolyte may be free of 4-methylene-1,3-dioxolan-2-one or 4,5-dimethylene-1,3-dioxolan-2-one. In any of the above embodiments, $R^8$, $R^9$ and $R^{10}$ may each independently be aryl or heteroaryl. In some embodiments, $R^8$, $R^9$ and $R^{10}$ are the same. In some embodiments, $R^8$, $R^9$ and $R^{10}$ are each independently heteroaryl.

Illustrative compounds of Formula IC include, but are not limited to:

The electrolytes may include any one or more of such compounds of Formula IC.

In any of the above embodiments, the electrolyte may further include one or more compounds represented as:

In the substantially non-aqueous electrolyte solution, the organophosphorus compound may be present in the electrolyte in an amount ranging from about 0.0005 wt % to about 50 wt %. In any of the above embodiments, the organophosphorus compound may be present in an amount ranging from about 0.005 wt % to about 30 wt %, or from about 0.05 wt % to about 25 wt %, or from about 0.1 wt % to about 15 wt %, or from about 0.1 wt % to about 10 wt %, or from about 0.5 wt % to about 5 wt %, or about 0.1 wt %, or about 0.2 wt %, or about 0.5 wt %, or about 1 wt %, or about 2 wt %, or about 3 wt %, or about 4 wt %, or about 5 wt %, or about 10 wt %. As used herein, "substantially non-aqueous" refers an electrolyte having less than 5 wt % water, and is intended to mean that the electrolyte is free of water, but that adventitious water may be found in the electrolyte from either the solvent, the salts or other additives, or from non-stringent handling procedures with respect to water exclusion. Accordingly, a substantially non-aqueous electrolyte may have less than 1 wt %. For example, in any of the above embodiments, the substantially non-aqueous electrolyte may have less than 0.5 wt % water, or less than 0.1 wt % water. In any of the above embodiments, the electrolyte may be entirely free of water.

As noted above, the electrolyte solution comprises an alkali metal salt. The salt may include alkali metal salts in general, and lithium metal salts in some specific embodiments. Suitable salts include those such as, but not limited to, $LiPF_6$, $LiClO_4$, $Li[B(C_2O_4)_2]$, $Li[BF_2(C_2O_4)]$, $Li[PF_4(C_2O_4)]$, $Li[N(CF_3SO_2)_2]$, $Li[C(SO_2CF_3)_3]$, $Li[N(C_2F_5SO_2)_2]$, $LiCF_3SO_3$, $Li_2B_{12}X_{12-n}H_n$, $Li_2B_{10}X_{10-n}H_{n'}$, $LiAlF_4$, $LiBF_4$, $Li(FSO_2)_2N$, $Li_2SO_4$, $LiAlO_2$, $LiSCN$, $LiBr$, $LiI$, $LiAsF_6$, $LiB(Ph)_4$, $LiSO_3CH_3$, $Li_2S_{x''}$, $Li_2Se_{x''}$, $(LiS_xR)_y$ or $(LiSe_xR)_y$; wherein X is a halogen, n is an integer from 0 to 12, n' is an integer from 0 to 10, x" is an integer from 1 to 20, y is an integer from 1 to 3, and R is H, alkyl, alkenyl, aryl, ether, F, $CF_3$, $COCF_3$, $SO_2CF_3$, $SO_2F$, or a mixture of any two or more thereof. In some embodiments, the alkali metal salt is other than a lithium(chelato)borate or lithium(chelato)phosphate. In some embodiments, where the alkali metal salt is other than a lithium(chelato)borate or lithium(chelato)phosphate, the electrolyte may further include about 0.0005 to about 15 wt % $Li[(C_2O_4)_2B]$ or $Li(C_2O_4)BF_2$. As used herein, a lithium(chelato)borate or lithium(chelato)phosphate is a lithium borate or phosphate compound, where the boron or phosphorus atom has a multi-dentate chelate. Illustrative lithium(chelato)borates include, but are not limited to, $Li[B(C_2O_4)_2]$, $Li[BF_2(C_2O_4)]$, and $Li[PF_4(C_2O_4)]$.

The substantially non-aqueous electrolytes may also include a polar aprotic solvent. The polar aprotic solvent may be any suitable solvent for use in a lithium call. Illustrative polar aprotic solvents include, but are not limited to, ethyl acetate, propyl acetate, dimethyl ether, diethyl ether, methyl acetate, ethylene carbonate, propylene carbonate, dimethyl carbonate, ethyl methyl carbonate, diethyl carbonate, methyl propyl carbonate, ethyl propyl carbonate, dipropyl carbonate, bis(trifluoroethyl)carbonate, bis(pentafluoropropyl)carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, perfluorobutyl ethyl carbonate, fluorinated oligomers, dimethoxyethane, triglyme, dimethylvinylene carbonate, tetraethyleneglycol, dimethyl ether, polyethylene glycols, sulfones, or gamma-butyrolactone. In certain embodiments, the polar aprotic solvent is ethylene carbonate or propylene carbonate.

In another aspect, an electrochemical device is provided. The electrochemical device may include a cathode, an anode, a porous separator disposed between the anode and cathode, and any of the substantially non-aqueous electrolytes, as described herein. The separator may be a porous polymer, ceramic, or glass separator and it may be a separate entity that is disposed between the cathode and anode, or it may be coated onto the cathode and/or anode. The electrochemical device may include multiple cells defined by a cathode, an anode, and a separator, or the electrochemical device may include a stacked conformation of cathodes, separators, and anodes.

In some embodiments, the electrolyte also includes a stabilizing agent. Such a stabilizing agent can be used to protect the electrodes from chemical attack, thereby lessening or preventing subsequent performance degradation. Specifically, it is believed that during initial formation of the electrochemical device, a stabilizing agent can be used to form a protective or passivating film on the surface of the positive electrode (cathode) and the negative electrode (anode). The film prevents ions from dissolving in the electrolyte and stabilizes the cell in general. Where a passivating film is formed on the anode, the film also lessens or prevents the reduction of $Mn^{2+}$ ions (from spinel cathodes) and $Fe^{2+}$ ions (from olivine cathodes) at the anode surface. During the film-forming process, inventive additives may be oxidized, or oxidized and polymerized. Additives of the invention typically have an oxidation potential ranging from about 1.5V and about 6.5V. Without being bound by theory, it is believed that the organophosphorus compounds may also form an SEI layer at the surface of the electrode.

Illustrative stabilizing agents include, but are not limited to, a spirocyclic hydrocarbon containing at least one oxygen atom and at least one alkenyl or alkynyl group. In some embodiments, a combination of two such additives is used. In some such embodiments, one stabilizing agent is selective for forming a passivating film on the cathode to prevent leaching of metal ions and the other additive can be selective for passivating the anode surface to prevent or lessen the reduction of metal ions at the anode. The stabilizing agents are typically present at a concentration of about 0.001 to about 8 wt %.

Additional stabilizing agents include, but are not limited to, pyridazine, vinyl pyridazine, quinoline, vinyl quinoline, pyridine, vinyl pyridine, indole, vinyl indole, triethanolamine, 1,3-dimethyl butadiene, butadiene, vinyl ethylene carbonate, vinyl carbonate, imidazole, vinyl imidazole, piperidine, vinyl piperidine, pyrimidine, vinyl pyrimidine, pyrazine, vinyl pyrazine, isoquinoline, vinyl isoquinoline, quinoxaline, vinyl quinoxaline, biphenyl, 1,2-diphenyl ether, 1,2-diphenylethane, o-terphenyl, N-methylpyrrole, naphthalene, 3,9-divinyl-2,4,8,10-tetraoxaspiro[5.5]undecane, 3,9-divinyl-2,4,8-trioxaspiro[5.5]undecane, 3,9-divinyl-2,4-dioxaspiro[5.5]undecane, 3,9-diethylidene-2,4,8,10-tetraoxaspiro[5.5]undecane, 3,9-diethylidene-2,4,8-trioxaspiro[5.5]undecane, 3,9-diethylidene-2,4-dioxaspiro[5.5]undecane, 3,9-dimethylene-2,4,8,10-tetraoxaspiro[5.5]undecane, 3,9-divinyl-1,5,7,11-tetraoxaspiro[5.5]undecane, 3,9-dimethylene-1,5,7,11-tetraoxaspiro[5.5]undecane, 3,9-diethylidene-1,5,7,11-tetraoxaspiro[5.5]undecane, or a mixture of any two or more thereof. In certain embodiments, one or more of 2,4-divinyl-tetrahydropyran, 2,5-divinyl-[1,3]dioxane, and 2-ethylidene-5-vinyl-[1,3]dioxane.

Further stabilizing agents that are for use in the electrochemical device provided herein include a spirocyclic hydrocarbons containing at least one oxygen atom and having at least one alkenyl or alkynyl group. For example, such stabilizing additives include those having Formula:

In such spirocyclic hydrocarbons, $B^1$, $B^2$, $B^3$, and $B^4$ are independently —O— or —$CR^{22}R^{23}$—; $G^1$, $G^2$, $G^3$, and $G^4$ are independently —O— or $CR^{22}R^{23}$—; provided that $G^1$ is not —O— when $B^1$ is —O—, $G^2$ is not —O— when $B^2$ is —O—, $G^3$ is not —O— when $B^3$ is —O—, and $G^4$ is not —O— when $B^4$ is —O—; and further provided that at least one of $B^1$, $B^2$, $B^3$, $B^4$, $G^1$, $G^2$, $G^3$, and $G^4$ is O. Further, $R^{20}$ and $R^{21}$ are each independently divalent alkenyl or divalent alkynyl; and $R^{22}$ and $R^{23}$ are each independently H, F, Cl, alkyl, alkenyl, or alkynyl. Representative spirocyclic compounds include, but are not limited to, 3,9-divinyl-2,4,8,10-tetraoxaspiro[5.5]undecane, 3,9-divinyl-2,4,8-trioxaspiro[5.5]undecane, 3,9-divinyl-2,4-dioxaspiro[5.5]undecane, 3,9-diethylidene-2,4,8,10-tetraoxaspiro[5.5]undecane, 3,9-diethylidene-2,4,8-trioxaspiro[5.5]undecane, 3,9-diethylidene-2,4-dioxaspiro[5.5]undecane, 3,9-dimethylene-2,4,8,10-tetraoxaspiro[5.5]undecane, 3,9-divinyl-1,5,7,11-tetraoxaspiro[5.5]undecane, 3,9-dimethylene-1,5,7,11-tetraoxaspiro[5.5]undecane, and 3,9-diethylidene-1,5,7,11-tetraoxaspiro[5.5]undecane, or a mixture of any two or more such spirocyclic compounds.

The cathode of the electrochemical device may include any suitable cathodic material. For example, the cathode may include spinel, olivine, carbon-coated olivine, $LiFePO_4$, $LiCoO_2$, $LiNiO_2$, $LiNi_{1-x}Co_yMet_zO_2$, $LiMn_{0.5}Ni_{0.5}O_2$, $LiMn_{0.3}Co_{0.3}Ni_{0.3}O_2$, $LiMn_2O_4$, $LiFeO_2$, $LiMet_{0.5}Mn_{1.5}O_4$, $Li_{1+x'}Ni_\alpha Mn_\beta Co_\gamma Met'_\delta O_{2-z'}F_{z'}$, $A_nB_2(XO_4)_3$ (Nasicon), vanadium oxide, or mixtures of any two or more thereof, wherein Met is Al, Mg, Ti, B, Ga, Si, Mn, or Co; Met' is Mg, Zn, Al, Ga, B, Zr, or Ti; A is Li, Ag, Cu, Na, Mn, Fe, Co, Ni, Cu, and Zn; B is Ti, V, Cr, Fe, and Zr; X is P, S, Si, W, Mo; $0 \leq x \leq 0.3$, $0 \leq y \leq 0.5$, $0 \leq z \leq 0.5$, $0 \leq m \leq 0.5$ and $0 \leq n \leq 0.5$; $0 \leq x' \leq 0.4$, $0 \leq \alpha \leq 1$, $0 \leq \beta \leq 1$, $0 \leq \gamma \leq 1$, $0 \leq \delta \leq 0.4$, and $0 \leq z' \leq 0.4$; and $0 \leq n' \leq 3$. In some embodiments, the cathode is a lithium metal oxide cathode.

The cathodes may be further stabilized by surface coating the particles of the spinel or olivine with a material that can neutralize acid or otherwise lessen or prevent leaching of the manganese or iron ions. Hence the cathodes can also comprise a surface coating of a metal oxide on the spinel or olivine particles such as $ZrO_2$, $TiO_2$, $ZnO_2$, $WO_3$, $Al_2O_3$, $MgO$, $SiO_2$, $SnO_2$ $AlPO_4$, $Al(OH)_3$, a mixture of any two or more thereof, or any other suitable metal oxide. The coating can also be applied to a carbon coated olivine. Where carbon coated olivine is used, the metal oxide coating can be applied to the carbon coated olivine or can be applied to the olivine first followed by carbon coating of the metal oxide film. Methods for coating spinel cathodes with metal oxides are disclosed herein and may be adapted for use with olivine cathodes.

In some embodiments the cathode is spinel, olivine, or carbon-coated olivine and the alkali metal salt of the electrolyte includes $Li[BF_2(C_2O_4)]$, $Li[(C_2O_4)_2B]$, or a mixture thereof. In some such embodiments, the electrode stabilizing additive is 3,9-divinyl-2,4,8,10-tetraoxaspiro[5.5]undecane, 3,9-divinyl-2,4,8-trioxaspiro[5.5]undecane, 3,9-divinyl-2,4-dioxaspiro[5.5]undecane, 3,9-diethylidene-2,4,8,10-tetraoxaspiro[5.5]undecane, 3,9-diethylidene-2,4,8-trioxaspiro[5.5]undecane, 3,9-diethylidene-2,4-dioxaspiro[5.5]undecane, 3,9-dimethylene-2,4,8,10-tetraoxaspiro[5.5]undecane, 3,9-divinyl-1,5,7,11-tetraoxaspiro[5.5]undecane, 3,9-dimethylene-1,5,7,11-tetraoxaspiro[5.5]undecane, 3,9-diethylidene-1,5,7,11-tetraoxaspiro[5.5]undecane, or a mixture of any two or more thereof. In any of these embodiments, the cathode can include a surface coating of a metal oxide as described herein.

The metal oxide coating on spinel can be applied using a variety of processes. For example, the coating element source can be dissolved in an organic solvent or water. The coating element sources include metal alkoxide, salt or oxide (e.g., aluminum isopropoxide or magnesium methoxide). Spinel cathode materials are then dispersed in the coating solution. The mixture is stirred until the organic solvent is completely evaporated. If necessary, a flushing gas ($CO_2$ or moisture-free inert gas) may be used to help facilitate evaporation of the solvent in the coating solution. The dried, coated material is then heat-treated at a temperature ranging from about 100° C. to about 500° C.

A $TiO_2$ coating can be applied to spinel powders by hydroxylation of tetra-n-butyl titanate (TBT). Thus, for example, the titanate can be reacted with LiOH to precipitate the titanium hydroxide onto the spinel powder. The coated material can be heat-treated at 100 to about 400° C. to yield spinel particles with the desired oxide coating.

A sol-gel process may also be employed in the coating of the spinel. The coating materials including M-ethylhexanate-diisopropoxide (M=Zr, Al, Ti, B, Si) and tin ethylhexanoisopropoxide can be dissolved in alcohol (e.g., 2-propanol or isopropanol). The cathode materials are then mixed with the coating solution and annealed at from about 100° C. to about 500° C. Alternatively, a coating solution can be prepared by dissolving ethyl silicate in ethanol and water. Spinel powder is immersed in the coating solution, stirred, dried at 110° C., and then is calcined at from about 200° C. to about 500° C.

The process of coating spinel with $AlPO_4$ may be carried out by dissolving aluminum nitrate and ammonium phosphate in water until a light white suspension solution (the $AlPO_4$ nanoparticle solution) is observed. Spinel cathode powder is then added to the coating solution and mixed. The slurry may be dried and annealed at from about 100° C. to about 500° C.

Colloidal suspensions may also be used to coat spinel with metal oxides. For example, the spinel powders can be coated using about 4 wt % (about 0.3 mol %) colloidal $ZrO_2$ suspension. The spinel particles are immersed and stirred in the $ZrO_2$ suspension for about 1 h, followed by evaporation of the nascent liquid at 75° C. Thereafter, the products can be heated at about 200 to 400 or 500° C.

Alternatively, the $ZrO_2$ coating of spinel can be carried out by using two different coating solutions (zirconium oxide+polymeric precursor or an aqueous solution of zirconium nitrate). Spinel could be mixed with the coating solutions until the mixture is dry. Then the mixture could be heated at 100° C. to evaporate the solvents in the coating solutions. The dried mixture could be heat-treated at 200-500° C.

A $ZnO_2$ coating can be applied to the spinel by dissolving zinc acetate in water, followed by adding the spinel powder, and thoroughly mixing for about 4 h at room temperature. After drying, the coated powder is heated at 120° C., and is further calcined at about 200° C. to about 400° C.

Finally, a spinel can be coated using a co-precipitation process. Spinel powder is dispersed into a $NaHCO_3$ solution and ultrasonically agitated. The suspension is then stirred mechanically while $Al_2(SO_4)_3$ solution is added drop wise to it. In this way, $Al(OH)_3$ is precipitated onto the spinel particle surface. The final powder is filtered, washed, and dried. The dried powder is heated in air at about 200° C. to about 600° C.

Stabilized electrodes including blends of materials and electrochemical devices employing the same are also within the scope of the present invention. For example, the cathode can include a blend of spinel and $Li_{1+x'}Ni_\alpha Mn_\beta Co_\gamma Met'_\delta O_{2-z'}F_{z'}$, wherein Met' is Mg, Zn, Al, Ga, B, Zr, or Ti; and wherein $0 \leq x' \leq 0.4$, $0 \leq \alpha \leq 1$, $0 \leq \beta \leq 1$, $0 \leq \gamma \leq 1$, $0 \leq \delta \leq 0.4$, and $0 \leq z' \leq 0.4$. The ratio of spinel to $Li_{1+x'}Ni_\alpha Mn_\beta Co_\gamma Met'_\delta O_{2-z'}F_{z'}$ is typically from about 0.5 to about 60 wt %. Suitable cathodes can also include a blend of olivine or carbon coated olivine and $Li_{1+x}Ni_\alpha Mn_\beta Co_\gamma Met'_\delta O_{2-z'}F_{z'}$, wherein Met' is Mg, Zn, Al, Ga, B, Zr, or Ti; and wherein $0 \leq x \leq 0.4$, $0 \leq \alpha \leq 1$, $0 \leq \beta \leq 1$, $0 \leq \gamma \leq 1$, $0 \leq \delta \leq 0.4$, and $0 \leq z \leq 0.4$. As before, the ratio of olivine or carbon-coated olivine to $Li_{1+x}Ni_\alpha Mn_\beta Co_\gamma Met'_\delta O_{2-z'}F_{z'}$ can be from about 0.5 to about 98 wt %.

The anode of the electrochemical device disclosed herein can comprise any suitable material. For example, the anode may comprise graphite, amorphous carbon, $Li_4Ti_5O_{12}$, tin alloys, silicon alloys, intermetallic compounds, lithium metal, or mixtures of any two or more thereof. Suitable graphitic materials including natural graphite, artificial graphite, graphitized meso-carbon microbeads, and graphite fibers, as well as any amorphous carbon materials. In some embodiments, the anode is a carbon or lithium metal anode. In other embodiments, the anode is a natural graphite or hard carbon anode.

The electrodes (i.e., the cathode and/or the anode) may also include a conductive polymer. Illustrative conductive polymers include, but are not limited to, polyaniline, polypyrrole, poly(pyrrole-co-aniline), polyphenylene, polythiophene, polyacetylene, polysiloxane, or polyfluorene.

The electrochemical device disclosed herein also includes a porous separator to separate the cathode from the anode and prevent, or at least minimize, short-circuiting in the device. The separator may be a polymer or ceramic separator. For example, the separator may include, but is not limited to, polypropylene (PP), polyethylene (PE), trilayer (PP/PE/PP), or polymer films that may optionally be coated with alumina-based ceramic particles.

In one embodiment, the electrochemical device disclosed herein is a lithium secondary battery The present invention, thus generally described, will be understood more readily by reference to the following examples, which are provided by way of illustration and are not intended to be limiting of the present invention.

EXAMPLES

Example 1

Synthesis of Ethylene Methyl Phosphate ("EMP")

EMP was prepared according to the following procedure. Methanol (35 mmol), triethylamine (35 mmol) and tetrahydrofuran (THF; 70 ml) were added into a reaction flask and cooled to −10° C. in an ice-salt bath. A solution of 2-chloro-1,3,2-dioxaphospholane 2-oxide ("COP"; 5 g; 35 mmol) in THF (10 ml) was then added drop-wise, and a white precipitate appeared immediately. To ensure a temperature lower than 0° C., the COP was added slowly over about 1 h. The ice-salt bath was withdrawn and the reaction was allowed to warm to room temperature, overnight. The solids were then removed by filtration, and the filtrate was evaporated to dryness to provide a yellow, viscous residue. The yellow viscous liquid was then distilled using Kugelrohr distillation at 140° C. and 50 Pa to give 2-methoxy-1,3,2-dioxaphospholane-2-oxide or ethylene methyl phosphate (EMP; 3.5 g; yield 72%).

The chemical structure of EMP as provided above was confirmed by proton NMR. $^1$H NMR (300 MHz, CDCl$_3$) δ ppm 4.43 (m, 2H), 4.33 (m, 2H), 3.81 (d, J=69 Hz, 3H). It is contemplated that the complex coupling pattern seen in the NMR of EMP is due to the stereo difference of the methylene and phosphor coupling effect. The CH$_2$—CH$_2$ group was observed as two groups of peaks at around 4.4 and 4.3 ppm and the methoxy group was split by the adjacent phosphor group resulting in a doublet around 3.8 ppm.

The EMP as provided above was analyzed by gas chromatography and determined to have a purity of 97.4% (major peak at 7.78 min with a minor peak at 8.22 min). The gas chromatograph used helium as the carrier gas with the solvent decay set at 3 min.

Example 2

Figure 1:
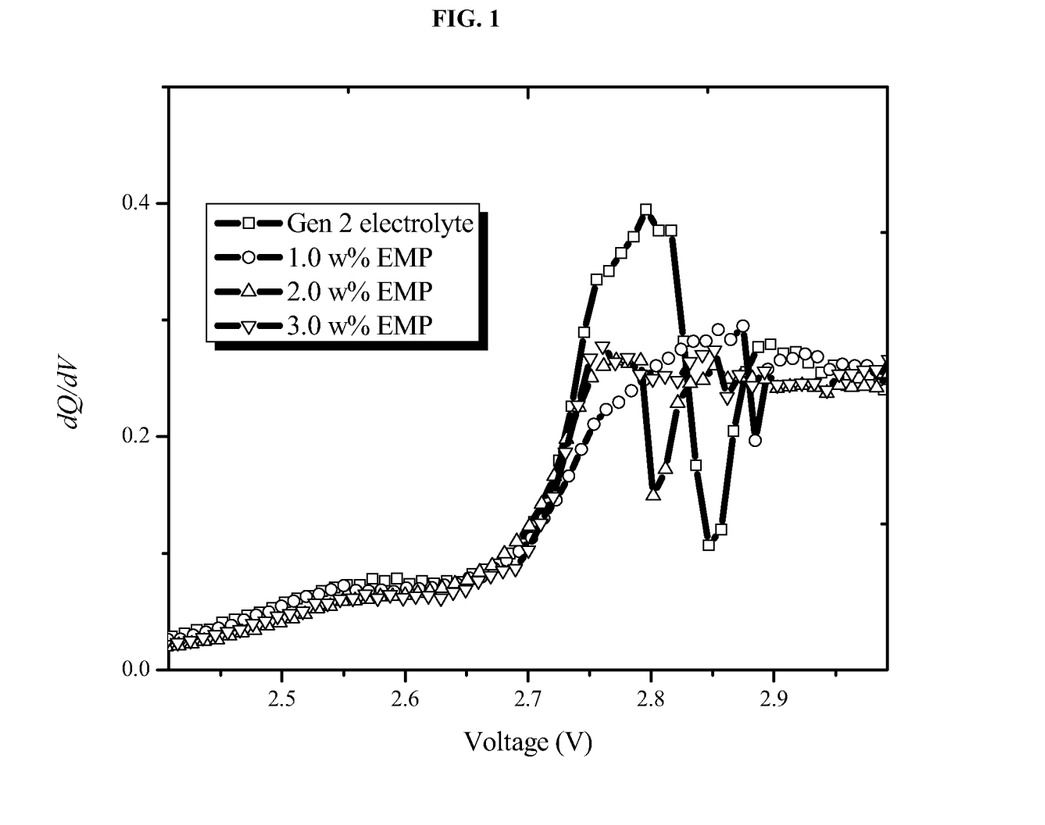
FIG. 1 shows the differential capacity profiles of the cells of Example 2.

Three separate 2032 coins cells were prepared with the EMP from Example 1. Cell A included 1.0 wt % of the EMP, Cell B included 2.0 wt %, and Cell C included 3.0 wt %. All of the cells contained 1.2 M LiPF$_6$ in EC:EMC ("Gen 2 electrolyte"; 3:7 by wt %), and Li$_{1.1}$[Ni$_{1/3}$Co$_{1/3}$Mn$_{1/3}$]$_{0.9}$O$_2$/MCMB as electrodes. The cells were then cycled at 55° C. for 2 cycles at a C/10 rate of between 3 and 4 V. Another cell (Cell Control) using the same electrolyte without EMP was also cycled under the same conditions as a control. The results were separately converted to differential capacity profiles and compared to determine the difference in SEI formation. FIG. 1 shows the AC impedance profile of the cells having EMP compared to control. The cells were charged to 3.8 V after 200 cycles at 55° C. with a constant current of 1 C (about 2.0 mA). The difference can be seen in FIG. 1, which shows that EMP did decompose at a specific constant potential.

Example 3

Figure 2:
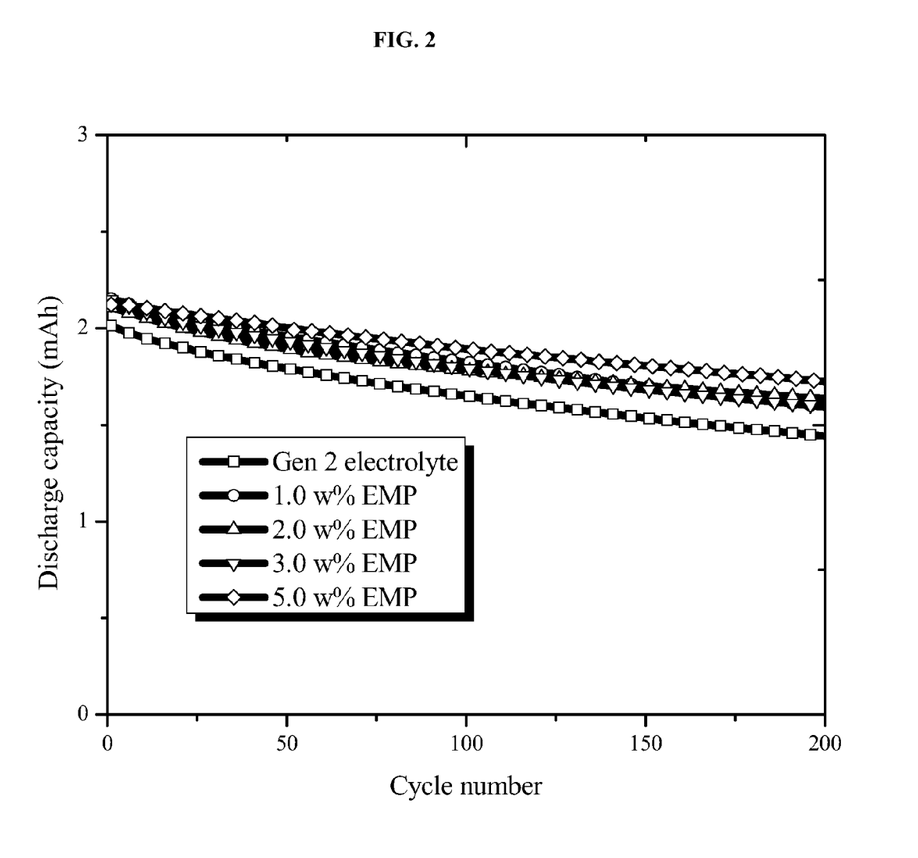
FIG. 2 shows the capacity retention profiles of the cells of Example 3.

The cells from Example 2 and a cell with 5 wt % EMP (Cell E) were then cycled at 55° C. for 200 cycles at 1 C rate between 3~4 V with a constant current of 1 C (about 2.0 mA). The capacity retention profiles are shown in FIG. 2. As shown in the figure, capacity retentions were much improved with the addition of EMP, particularly for the electrolyte with 5.0 wt % EMP. The results of Example 3 strongly indicate EMP participation in the SEI formation process and formation of a more stable passivation film.

Example 4

Figure 3:
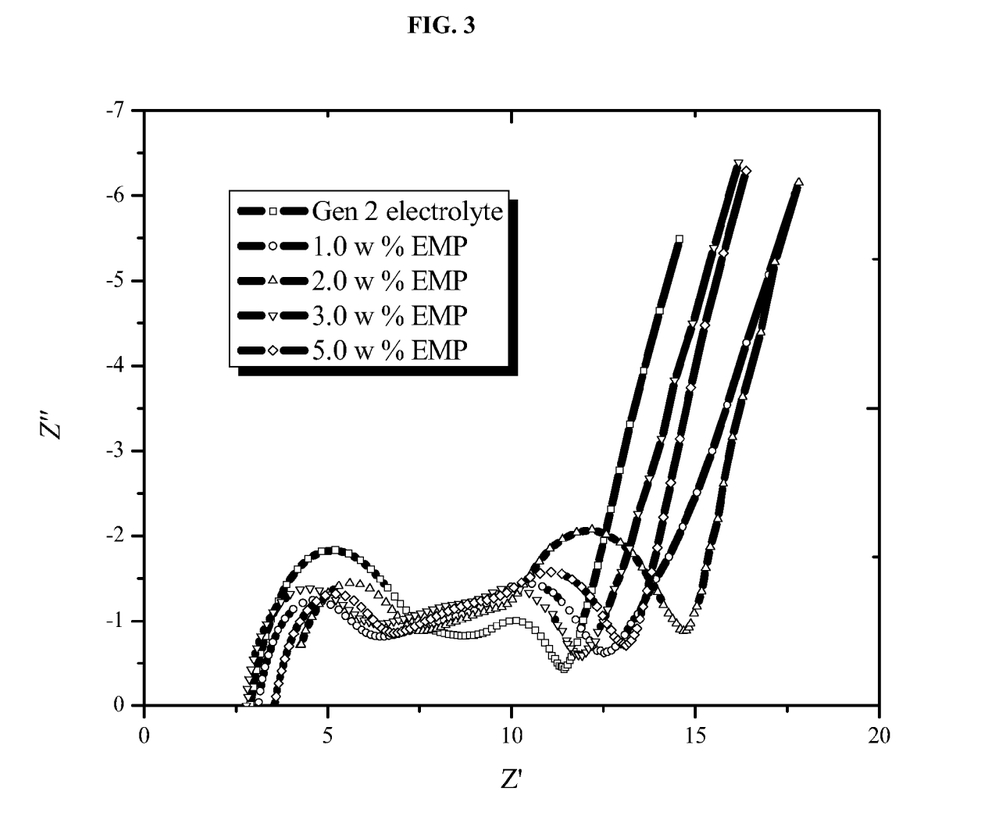
FIG. 3 shows the AC impedance profiles of the cells of Example 4.

Cells according to Example 2 and a cell with 5 wt % EMP (Cell E) were tested for AC impedance results before 200 cycles at 55° C. The cells were charged to 3.8 V with a constant current followed by a constant voltage method to assure the same state of charge (SOC) of the cells. The AC impedance was collected over a frequency range of 10 mHz~1 MHz with Solartron Analytic 1470E cell test system coupled with 1454A Frequency Response Analyzer. As shown in FIG. 3, the interfacial impedance of the cells with additives is all slightly larger than that of the cell with no additive, and do not appear to correspond to the order of the additive amount. Cell B (2.0 wt % EMP) showed the largest AC impedance among the cells. The remaining cells with EMP showed a general trend in impedance increase, that is, the more EMP, the larger impedance. The increase of interfacial impedance is not necessarily favorable to the cell performance in terms of power, however, even for the largest impedance of the EMP cell, the increase is still very small compared to that of the cell with no EMP. Therefore, EMP can be considered to not only improve the cell cyclability, but also to at least partially control impedance increase.

Example 5

Figure 4:
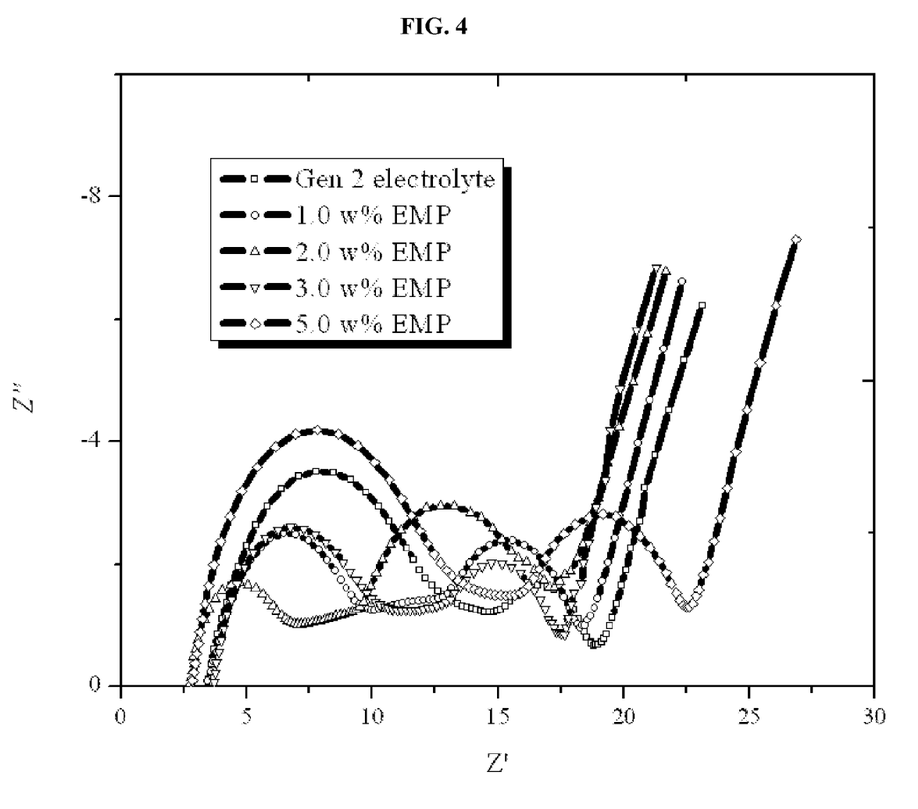
FIG. 4 shows the AC impedance profiles of the cells of Example 5.

The cells of Example 4 were tested for AC impedance results again after the 200 cycles at 55° C. The cells were charged to 3.8 V with a constant current followed a constant voltage method to assure the same SOC states. As shown in FIG. 4, the interfacial impedance of the cells with additive increased after 200 cycles, although they were still comparable to that of the straight electrolyte cell. In addition, some cells showed smaller impedance results than that of the cell without additives.

Example 6

Figure 5:
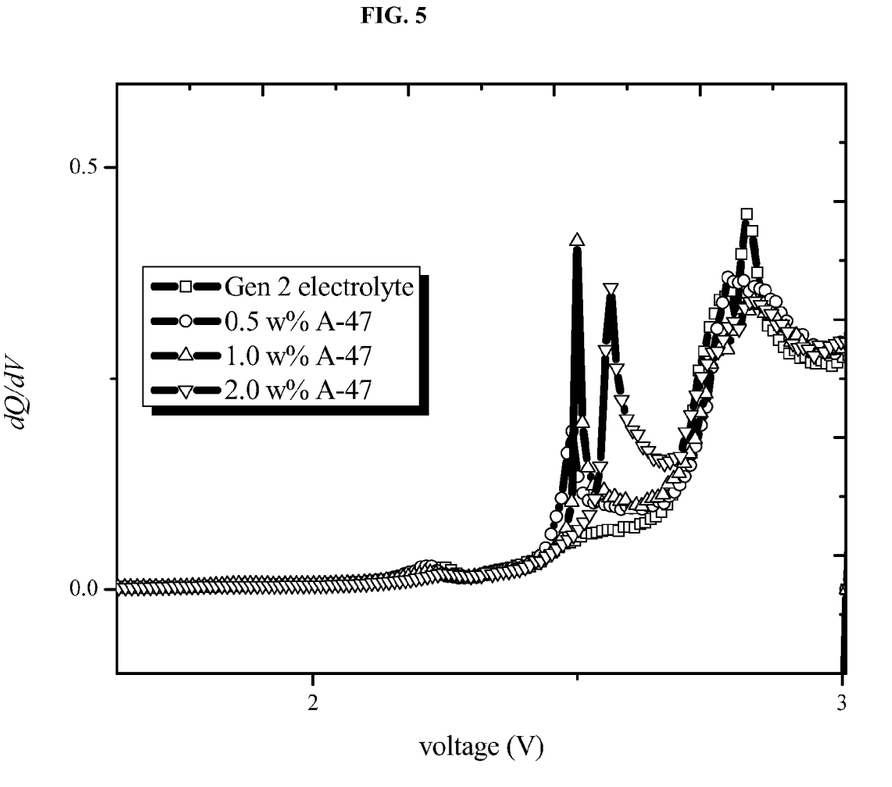
FIG. 5 shows the differential capacity profiles of the cells of Example 6

Various amounts of tri(2-furyl)phosphine (TFP, commercially available) were added to an electrolyte of 1.2 M $LiPF_6$ in EC:EMC (3:7 by wt %), and then tested in 2032 coin cells using $Li_{1.1}[Ni_{1/3}Co_{1/3}Mn_{1/3}]_{0.9}O_2$/MCMB (mesocarbon microbeads) as electrodes. The cells were cycled at 55° C. for 2 cycles at C/10 rate between 3~4 V. A cell using straight electrolyte without additive was cycled under the same condition as a control. The differential capacity profiles of each cell are shown in FIG. 5. FIG. 5 demonstrates difference in SEI formation. By comparison, new peaks derived from the TFP decomposition process were clearly identified around 2.5~2.6 V. These peaks are strong evidence of TFP participation in the SEI formation process.

Example 7

Figure 6:
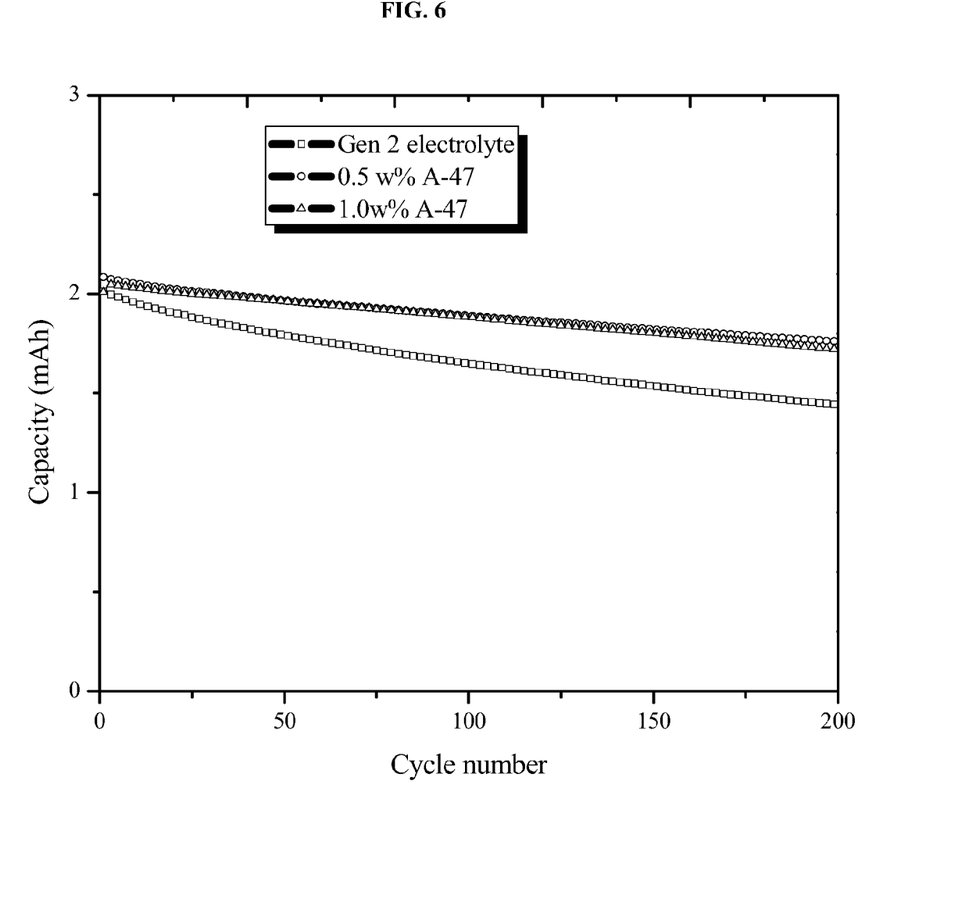
FIG. 6 shows the capacity retention profiles of the cells of Example 7.

The cells of example 6 were then cycled at 55° C. for 200 cycles at 1 C rate between 3~V. The capacity retention profiles of the cells are shown in FIG. 6. With the addition of TFP, the capacity retention improved, especially for the electrolytes with 0.5 and 1.0 wt % TFP. However, when the amount reached 2.0 wt %, the capacity retention was not improved. The results indicate that appropriate amount of TFP can form a strong SEI layer and improve the cell performance, but excess amount of TFP may not bring any benefits.

Example 8

Figure 7:
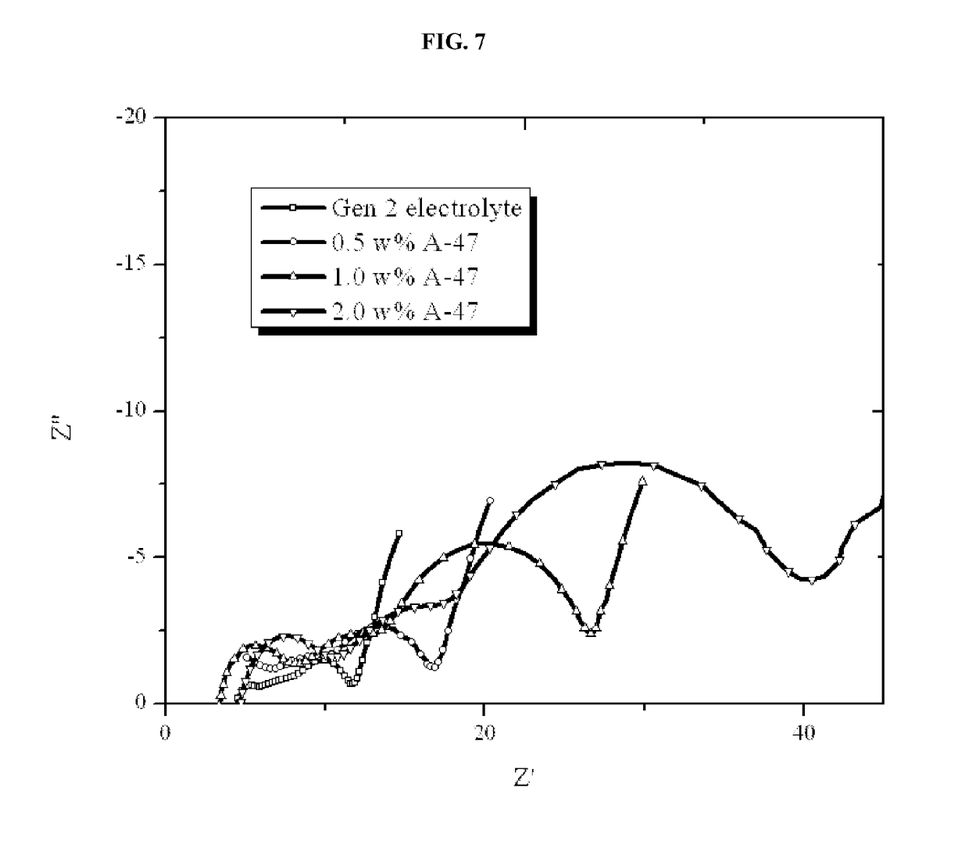
FIG. 7 shows the impedance profiles of the cells of Example 8.

The cells of Example 7 were tested for AC impedance results before being subjected to 200 cycles at 55° C. The cells were charged to 3.8 V with a constant current followed by a constant voltage method to assure the same SOC states. The AC impedance was collected over a frequency range of 10 MHz~1 MHz with Solartron Analytic 1470E cell test system coupled with 1454A Frequency Response Analyzer. As shown in FIG. 7, the interfacial impedance of the cells with additives are all larger than that of the cell with no additive, and increased as the amount of TFP increased. However, the increase of the interfacial impedance is not favorable to the cell performance in terms of power applications.

Example 9

Figure 8:
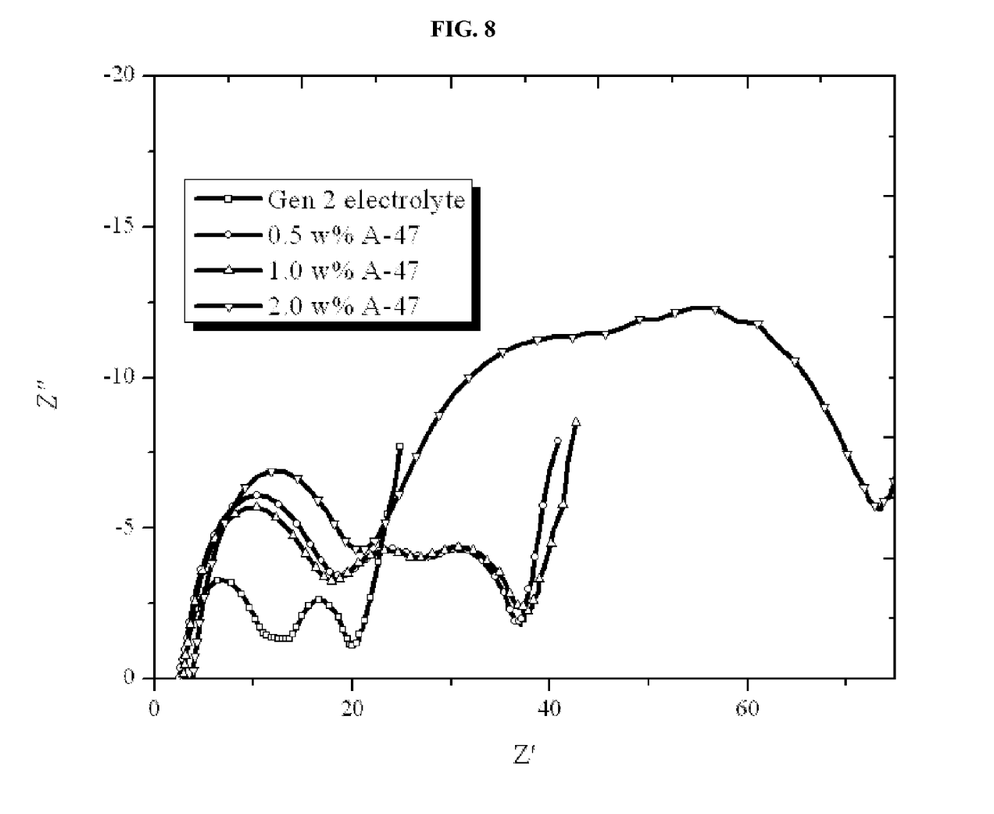
FIG. 8 shows the impedance profiles of the cells of Example 9.

The cells of Example 8 were tested for AC impedance results again after 200 cycles at 55° C. The cells were charged to 3.8 V with a constant current followed a constant voltage method to assure the same SOC states. As shown in FIG. 8, the interfacial impedance of the cells with additive increased after 200 cycles, and all impedance values were grater than that of the control (without additive). In addition, some cells showed a smaller impedance than that of the control. For the 0.5 wt % and 1.0 wt % TFP cells, the impedance values were substantially the same.

While certain embodiments have been illustrated and described, it should be understood that changes and modifications may be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A substantially non-aqueous electrolyte solution comprising:
    an alkali metal salt;
    a polar aprotic solvent; and
    an organophosphorus compound of Formula IA or IB:

wherein:
   $R^1$, $R^2$, $R^3$ and $R^4$ are each independently hydrogen, halogen, alkyl, alkenyl, alkynyl, cycloalkyl, aryl, heterocyclyl, heteroaryl, alkoxy, alkenoxy, alkynoxy, cycloalkoxy, aryloxy, heterocyclyloxy, heteroaryloxy, siloxyl, silyl, or organophosphatyl;
   $R^5$ and $R^6$ are each independently alkyl, alkenyl, alkynyl, cycloalkyl, aryl, heterocyclyl, or heteroaryl;
   $R^7$ is provided that if the organophosphorus compound is of Formula IB, then at least one of $R^5$, and $R^6$ are other alkyl, alkenyl or aryl.

2. The electrolyte of claim 1, wherein the organophosphorus compound is present in the electrolyte from about 0.0005 wt % to about 50 wt %.

3. The electrolyte of claim 1, wherein the alkali metal salt is a lithium salt.

4. The electrolyte of claim 3, wherein the alkali metal salt comprises $LiPF_6$, $LiClO_4$, $Li[B(C_2O_4)_2]$, $Li[BF_2(C_2O_4)]$, $Li[PF_4(C_2O_4)]$, $Li[N(CF_3SO_2)_2]$, $Li[C(SO_2CF_3)_3]$, $Li[N(C_2F_5SO_2)_2]$, $LiCF_3SO_3$, $Li_2B_{12}X_{12-n}H_n$, $Li_2B_{10}X_{10-n'}H_{n'}$, $LiAlF_4$, $LiBF_4$, $Li(FSO_2)_2N$, $Li_2SO_4$, $LiAlO_2$ $LiSCN$, $LiBr$, $LiI$, $LiAsF_6$, $LiB(Ph)_4$, $LiSO_3CH_3$, $Li_2S_{x''}$, $Li_2Se_{x''}$, $(LiS_xR)_y$ or $(LiSe_xR)_y$; wherein X is a halogen, n is an integer from 0 to 12, n' is an integer from 0 to 10, x" is an integer from 1 to 20, y is an integer from 1 to 3, and R is H, alkyl, alkenyl, aryl, ether, F, $CF_3$, $COCF_3$, $SO_2CF_3$, $SO_2F$, or a mixture of any two or more thereof.

5. The electrolyte of claim 1, wherein the polar aprotic solvent is ethyl acetate, propyl acetate, dimethyl ether, diethyl ether, methyl acetate, ethylene carbonate, propylene carbonate, dimethyl carbonate, ethyl methyl carbonate, diethyl carbonate, methyl propyl carbonate, ethyl propyl carbonate, dipropyl carbonate, bis(trifluoroethyl) carbonate, bis(pentafluoropropyl) carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, perfluorobutyl ethyl carbonate, fluorinated oligomers, dimethoxyethane, triglyme, dimethylvinylene carbonate, tetraethyleneglycol, dimethyl ether, polyethylene glycols, sulfones, or gamma-butyrolactone.

6. The electrolyte of claim 1, wherein $R^1$, $R^2$, $R^3$ and $R^4$ are each independently methyl, ethyl, n-propyl, iso-propyl, n-butyl, sec-butyl, tert-butyl, 2-propenyl, 3-butenyl, 2-propynyl or 3-butynyl.

7. The electrolyte of claim 1, wherein the organophosphorus compound is of Formula IA.

8. The electrolyte of claim 1, wherein the organophosphorus compound is of Formula IB.

9. The electrolyte of claim 1, wherein the electrolyte further comprises a compound of formula:

10. A substantially non-aqueous electrolyte solution comprising:
    an alkali metal salt;
    a polar aprotic solvent; and
    an organophosphorus compound of formula:

or

-continued

11. A substantially non-aqueous electrolyte solution comprising:
   an alkali metal salt;
   a polar aprotic solvent; and
   an organophosphorus compound of formula:

12. A substantially non-aqueous electrolyte solution comprising:
   an alkali metal salt;
   a polar aprotic solvent; and
   an organophosphorus compound of formula:

13. An electrochemical device comprising
   a cathode
   an anode;
   a porous separator which separates the anode and the cathode; and
   the electrolyte of claim 1.

14. The electrochemical device of claim 13, wherein the device is a lithium secondary battery.

15. The electrochemical device of claim 13, wherein the cathode comprises a lithium metal oxide.

16. The electrochemical device of claim 13, wherein the anode comprises a carbon material or a lithium metal.

17. The electrochemical device of claim 16, wherein the anode is a natural graphite or a hard carbon anode.

* * * * *

UNITED STATES PATENT AND TRADEMARK OFFICE
CERTIFICATE OF CORRECTION

PATENT NO.       : 9,246,187 B2
APPLICATION NO.  : 13/803725
DATED            : January 26, 2016
INVENTOR(S)      : Khalil Amine, Lu Zhang and Zhengcheng Zhang

It is certified that error appears in the above-identified patent and that said Letters Patent is hereby corrected as shown below:

Claims

In Column 19, Claim 11, Lines 16-30, replace the third structure with:

In Column 20, Claim 12, Lines 6-16, replace the structure with:

Signed and Sealed this
Twenty-sixth Day of April, 2016

Michelle K. Lee
*Director of the United States Patent and Trademark Office*